US012586239B2

(12) United States Patent
    Shin

(10) Patent No.: US 12,586,239 B2
(45) Date of Patent: Mar. 24, 2026

(54) SMART IMAGE PROCESSING METHOD AND DEVICE USING SAME

(71) Applicant: MOBILINT INC., Seoul (KR)

(72) Inventor: Dongjoo Shin, Guri-si (KR)

(73) Assignee: MOBILINT INC., Seoul (KR)

( * ) Notice: Subject to any disclaimer, the term of this patent is extended or adjusted under 35 U.S.C. 154(b) by 377 days.

(21) Appl. No.: 18/335,210

(22) Filed: Jun. 15, 2023

(65) Prior Publication Data

US 2023/0326070 A1    Oct. 12, 2023

Related U.S. Application Data

(63) Continuation of application No. PCT/KR2020/018858, filed on Dec. 22, 2020.

(30) Foreign Application Priority Data

Dec. 22, 2020    (KR) ........................ 10-2020-0180493

(51) Int. Cl.
G06T 7/73               (2017.01)

(52) U.S. Cl.
CPC ...... G06T 7/73 (2017.01); G06T 2207/20044 (2013.01); G06T 2207/20084 (2013.01)

(58) Field of Classification Search
CPC ............. G06T 7/73; G06T 2207/20044; G06T 2207/20084; G06T 5/60; G06T 5/77; G06T 2207/30196; G06T 7/251; G06T 11/60; H04N 21/4318; H04N 5/77; H04N 5/92
See application file for complete search history.

(56) References Cited

U.S. PATENT DOCUMENTS

| | | | |
|---|---|---|---|
| 8,620,091 B2 | 12/2013 | Choi | |
| 9,292,967 B2 | 3/2016 | Black et al. | |
| 9,489,744 B2 | 11/2016 | Black et al. | |
| 9,761,060 B2 | 9/2017 | Black et al. | |
| 10,388,078 B2 | 8/2019 | Black et al. | |
| 11,062,528 B2 | 7/2021 | Black et al. | |
| 2011/0123076 A1 | 5/2011 | Choi | |
| 2013/0249908 A1 | 9/2013 | Black et al. | |
| 2015/0248583 A1* | 9/2015 | Sugita ..................... G06T 19/00 |
| | | | 348/77 |

(Continued)

FOREIGN PATENT DOCUMENTS

| | | |
|---|---|---|
| JP | 2002-175527 A | 6/2002 |
| JP | 2007-213181 A | 8/2007 |

(Continued)

OTHER PUBLICATIONS

Machine translation for TW-1263944 (Year: 2006).*
International Search Report issued in PCT/KR2020/018858; mailed Sep. 6, 2021.

*Primary Examiner* — Qian Yang
(74) *Attorney, Agent, or Firm* — Studebaker Brackett PLLC

(57)    ABSTRACT

A smart image processing method and a device using same are provided. The method comprises: an image acquisition unit of acquiring an image for a specific area; an image conversion step of, when a person is detected in the acquired image, converting a body image of the person in the image into an image in which the person is wearing outer clothing; and a storage step of storing the converted image.

4 Claims, 6 Drawing Sheets

(56)  References Cited

U.S. PATENT DOCUMENTS

| | | | |
|---|---|---|---|
| 2016/0275693 A1 | 9/2016 | Black et al. | |
| 2017/0069102 A1 | 3/2017 | Black et al. | |
| 2018/0122146 A1 | 5/2018 | Black et al. | |
| 2019/0205608 A1* | 7/2019 | Weitzman | G06V 40/165 |
| 2019/0385381 A1 | 12/2019 | Black et al. | |

FOREIGN PATENT DOCUMENTS

| | | | |
|---|---|---|---|
| JP | 2014-002515 A | | 1/2014 |
| KR | 10-2007-0113661 A | | 11/2007 |
| KR | 10-2011-0056952 A | | 5/2011 |
| TW | 1263944 | * | 10/2006 |

* cited by examiner

500

| Smart image processing device | |
|---|---|
| Image acquisition unit | 510 |
| Image conversion unit | 520 |
| Storage unit | 530 |

Figure 8:
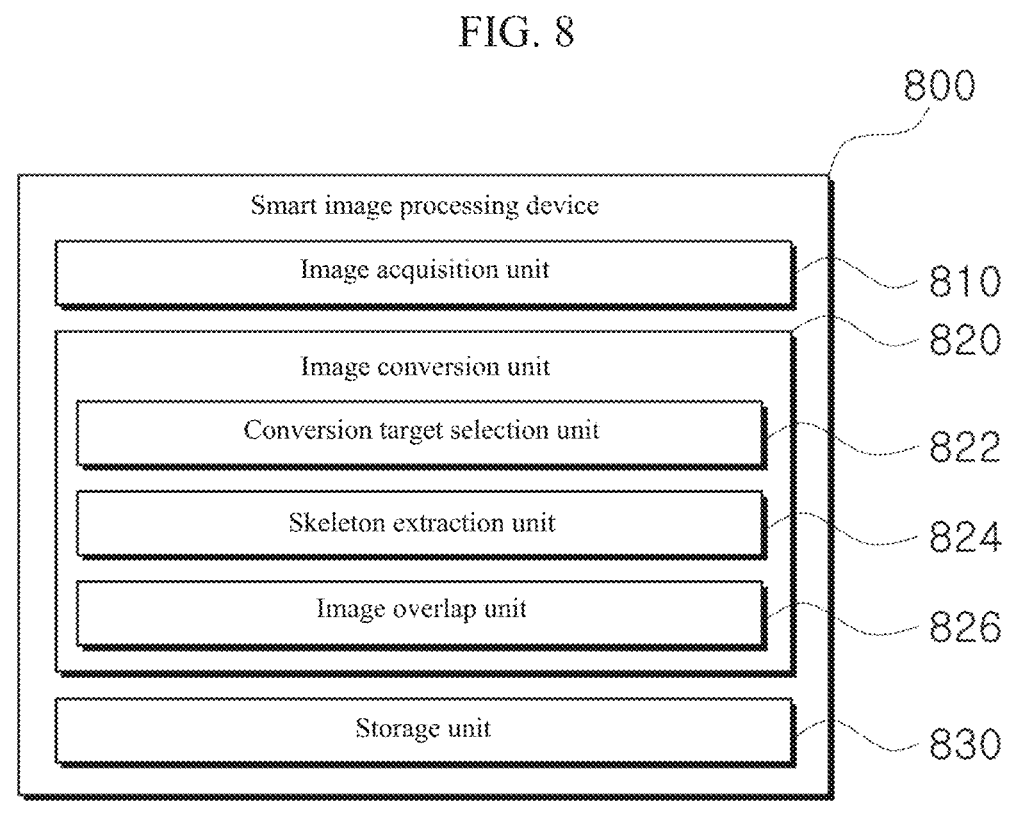

Smart image processing device

Image acquisition unit — 810

Image conversion unit — 820

Conversion target selection unit — 822

Skeleton extraction unit — 824

Image overlap unit — 826

Storage unit — 830

SMART IMAGE PROCESSING METHOD AND DEVICE USING SAME

CROSS-REFERENCE TO RELATED APPLICATIONS

The present application is a continuation of International Patent Application No. PCT/KR2020/018858, filed on Dec. 22, 2020, which is based upon and claims the benefit of priority to Korean Patent Application No. 10-2020-0180493 filed on Dec. 22, 2020. The disclosures of the above-listed applications are hereby incorporated by reference herein in their entirety.

BACKGROUND

The inventive concept relates to a smart image processing method and a smart image processing device using the same. More specifically, the inventive concept relates to a smart image processing method for selectively converting and storing personal sensitive information in a captured image and a smart image processing device using the same.

With the issue of invasion of personal privacy, it is prohibited to install security cameras in spaces where sensitive personal information may be exposed, such as changing rooms and toilets in Korean dry sauna, bathhouses, and gyms and capture the spaces. Due to this, there is no means to check whether a crime or an emergency has occurred in the corresponding space, and cases of abuse are increasing. As a method for solving this problem, Korean Patent Laid-Open Publication No. 10-2007-0113661 discloses a method of detecting a person face area in a captured image and simply mosaicizing, binarizing, and black-and-whitening other areas than the face area. However, according to the above prior art, the following problems may occur.

There is a possibility of restoring the original image, and privacy of individuals is not perfectly protected with only black and white, binary, and mosaic.

By transforming the entire background area except for the face, there is a risk of losing necessary information as well.

SUMMARY

Embodiments of the inventive concept provide a smart image processing method and a smart image processing device using the same capable of solving the above problems.

According to an embodiment, a smart image processing device includes an image acquisition unit that acquires an image for a predetermined area through a camera, an image conversion unit that performs conversion from a body image of a person in the image into an image of the person wearing outer clothing when the person is detected in the acquired image, and a storage unit that stores the converted image.

In this case, the image conversion unit may obtain skeleton data based on joints or movement points of the person by applying a skeleton modeling technique to the person detected in the acquired image, and perform conversion from the body image of the person into an image of the person wearing clothes based on the skeleton data.

Further, the image conversion unit may detect an image of one or more persons located in the predetermined area in the image based on a first deep learning algorithm, and perform the conversion only on a person determined not to be wearing outer clothing in the person image.

Further, the image conversion unit may determine that at least one of a naked person and a person wearing only underwear is not wearing outer clothing.

Further, the image conversion unit may perform conversion from the body image of the person into may process of the person wearing outer clothing based on a second deep learning algorithm different from the first deep learning algorithm by using a skeleton modeling technique for the naked person and the person wearing only underwear.

Further, the outer clothing includes clothes capable of covering at least one of all parts of the body image except a face, disliked parts that cause discomfort to others when exposed of an upper body of the body image except the face, and disliked parts of a lower body of the body image except the face.

According to an embodiment, a smart image processing method to be performed by a device includes acquiring, by an image acquisition unit of the device, an image for a predetermined area, performing, by an image conversion unit of the device, conversion from a body image of a person in the image into an image of the person wearing outer clothing when the person is detected in the acquired image, and storing, by a storage unit of the device, the converted image.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 4A to 4C are diagrams showing examples of image conversion phases according to the inventive concept; and FIGS. 5 to 8 are schematic diagrams illustrating a smart image processing device according to the inventive concept.

DETAILED DESCRIPTION

Figure 1:
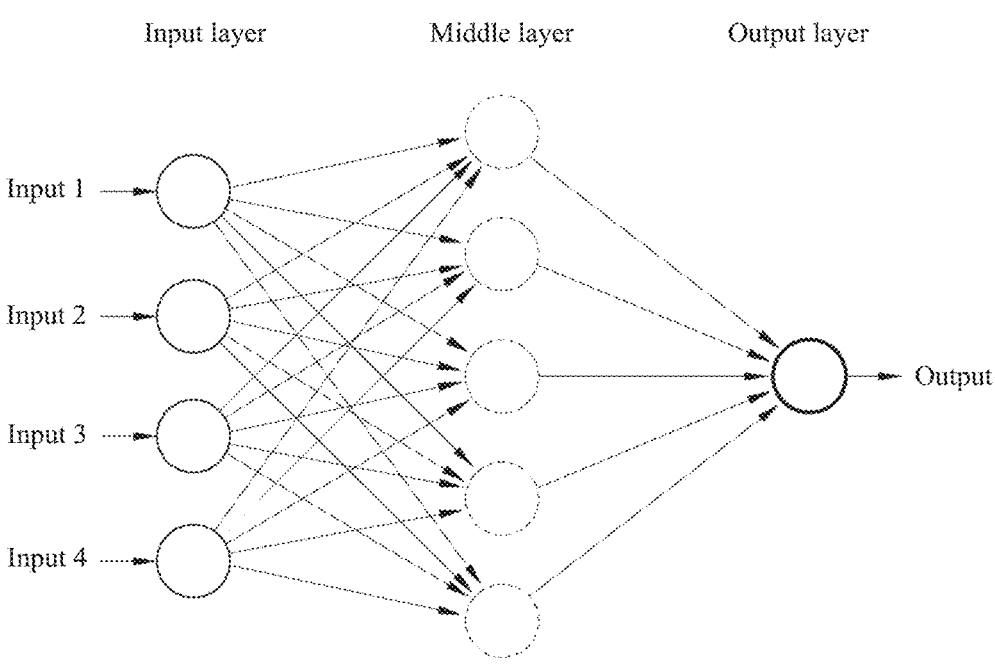
FIG. 1 is a diagram briefly illustrating the basic concept of an artificial neural network.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/ or "comprising" are intended to specify the presence of stated elements, but do not preclude the presence or addition of elements Like reference numerals refer to like elements throughout the specification, and "and/or" includes each and all combinations of one or more of the mentioned elements.

Although "first", "second", and the like are used to describe various components, these components are of course not limited by these terms. These terms are only used to distinguish one component from another. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Hereinafter, embodiments of the inventive concept will be described with reference to the accompanying drawings.

The inventive concept provides a method of processing a captured image through a deep learning algorithm.

Before the description, the meaning of the terms used herein will be briefly described. However, it should be noted that the description of terms is intended to help the understanding of the present specification and is not used in the sense of limiting the technical spirit of the inventive concept unless explicitly described as limiting the inventive concept.

First, a deep learning algorithm is one of machine learning algorithms and refers to a modeling technique developed from an artificial neural network modeled after a person neural network. An artificial neural network may be configured in a multi-layered structure as shown in FIG. 1.

FIG. 1 is a diagram briefly illustrating the basic concept of an artificial neural network.

As shown in FIG. 1, an artificial neural network (ANN) may have a layered structure including an input layer, an output layer, and at least one middle layer (or hidden layer) between the input layer and the output layer. The deep learning algorithm may derive highly reliable results through learning that optimizes weights of activation functions between layers based on such a multi-layered structure.

Deep learning algorithms applicable to the inventive concept may include a deep neural network (DNN), a convolutional neural network (CNN), a recurrent neural network (RNN), and the like.

The DNN is basically characterized by improving learning results by increasing the number of middle layers (or hidden layers) in the existing ANN model. For example, the DNN is characterized by performing a learning process using two or more middle layers. Accordingly, a computer may derive an optimal output value by repeating a process of generating classification labels, distorting space, and classifying data by the computer itself.

The CNN is characterized by having a structure of extracting features of data and figuring out a pattern of the features, unlike existing techniques in which a learning process is performed by extracting knowledge from data. The CNN may be performed through a convolution process and a pooling process. In other words, the CNN may include an algorithm complexly composed of a convolution layer and a pooling layer. Here, a process of extracting features of data (so-called a convolution process) is performed in the convolution layer. The convolution process is a process of examining adjacent components of each component in data to identify characteristics and deriving the identified characteristics as one sheet as a single compression process to effectively reduce the number of parameters. In the pooling layer, a process of reducing the size of the layer that has undergone the convolution process (so-called a pooling process) is performed. The pooling process may reduce the size of data, cancel noise, and provide consistent features in fine parts. For example, the CNN may be used in various fields such as information extraction, sentence classification, and face recognition.

The RNN is a type of artificial neural network specialized in learning repetitive and sequential data and is characterized by having a circular structure therein. The RNN uses the circular structure to apply weights to past learning contents and reflect them to current learning, enabling a connection between current learning and past learning, and has the characteristic of being dependent on time. The RNN is an algorithm that solves the limitations in existing learning of continuous, iterative, and sequential data, and may be used for recognizing a speech waveform or identifying front and rear components of text.

However, these are only examples of specific deep learning techniques applicable to the inventive concept, and other deep learning techniques may be applied to the inventive concept according to embodiments.

An image described below may include any one of a still image such as a photograph, a video, and each still image corresponding to each frame constituting the video.

Figure 2:
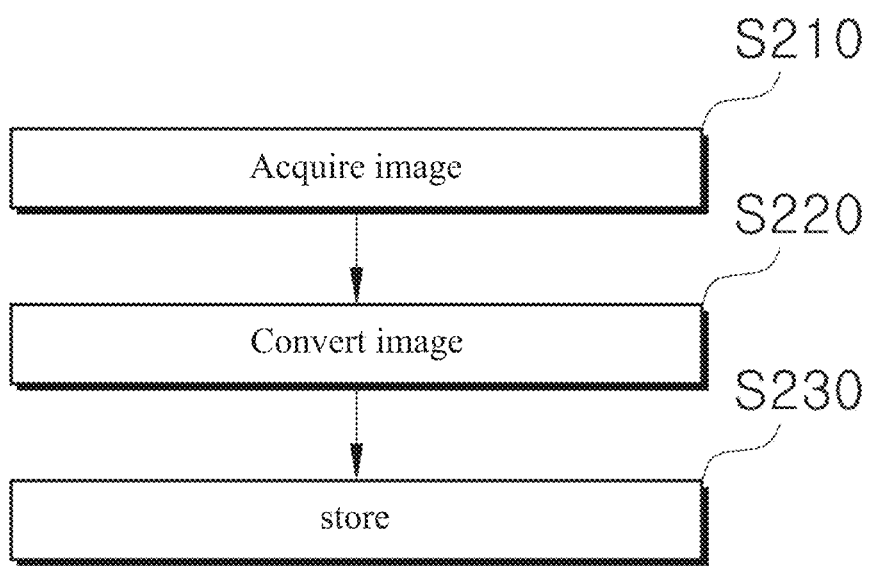
FIG. 2 is a schematic diagram illustrating a smart image processing method according to the inventive concept.

FIG. 2 is a schematic diagram illustrating a smart image processing method according to the inventive concept.

Referring to FIG. 2, a smart image processing method according to the inventive concept may include an image acquisition step (S210), an image conversion step (S220), and a storage step (S230).

For convenience of description below, it is assumed that the smart image processing method according to the inventive concept is performed by a smart image processing device. In this case, according to embodiments, the smart image processing device may be included in a security camera system as a module included in a security camera (e.g., a closed-circuit television (CCTV)) or, conversely, may include a security camera system.

In S210, the smart image processing device may acquire an image of a predetermined area. Here, the predetermined area may include an area captured by the smart image processing device.

In S220, the smart image processing device may determine whether a person is detected in the acquired image, and when the person is detected in the acquired image, perform conversion from a body image of the person (video or still image) in the image into an image (video or still image) of the person wearing outer clothing.

The outer clothing may cover at least one of all parts of the body image except the face, disliked parts of the upper body in the body image other than the face (parts that cause discomfort to others when exposed), and disliked parts of the face and the lower body in the body image.

The range of the outer clothing may vary widely. For example, outer clothing is a garment designed to cover all or part of the body except the face, as described above, and may include a single garment such as a Barbary coat or a dress, or costumes for well-known characters such as Spider-Man, or may include garments such as a typical long coat, long padding and a sweater. Of course, the outer clothing according to the inventive concept is not limited thereto, and may include clothes for covering all or some of parts of the body image except for the face as described above.

More specifically, the smart image processing device according to an embodiment of the inventive concept may perform image conversion processing as described below.

For example, the smart image processing device may perform conversion from the body image of the person into an image (video or still image) of the person wearing clothes by applying a skeleton modeling technique to the person detected in the image acquired through S210.

In this case, the body image of the person and the image of the person wearing clothes may be a video or each of still images of frames constituting the video.

Figure 3:
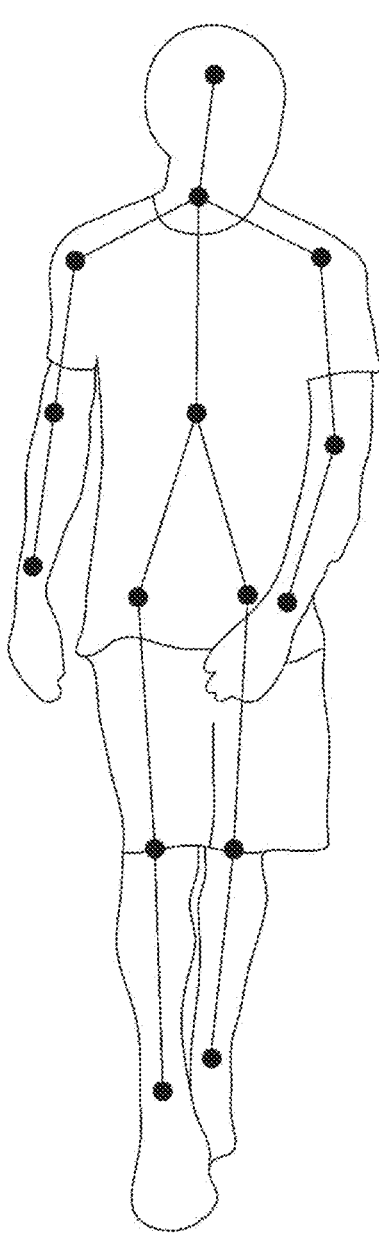
FIG. 3 is a diagram illustrating an example of extracting skeleton data from a person detected in an image acquired according to the inventive concept.

FIG. 3 is a diagram illustrating an example of extracting skeleton data from a person detected in an image acquired according to the inventive concept.

Referring to FIG. 3, the smart image processing device of the inventive concept may obtain skeleton (model) data considering a person's joints or movement points by applying a skeleton modeling technique to a person detected in an image. Through the skeleton (model) data, the smart image processing device may more thoroughly figure out the posture of a corresponding person. Through this, it is possible to convert the body image of the person into an image of the person wearing clothes (e.g., a clothing image, etc.) (video or still image).

Figure 4A:
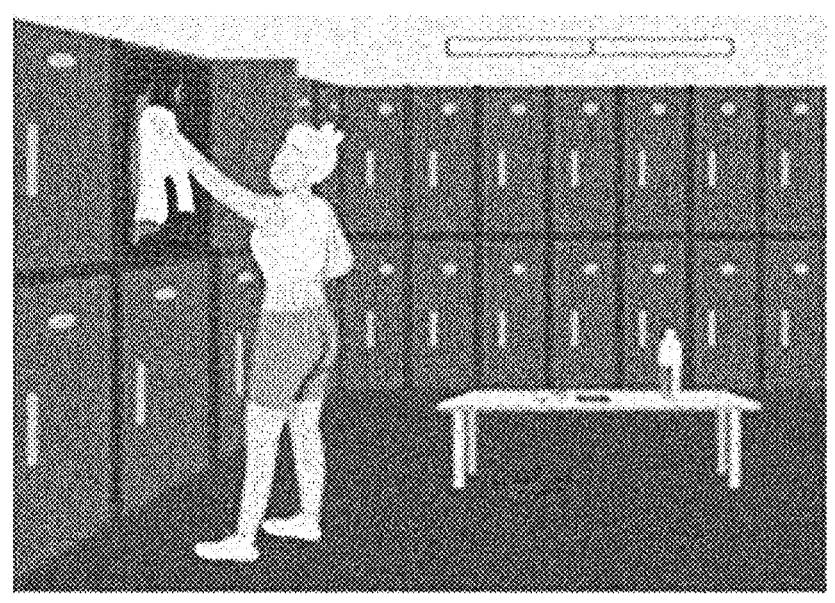
Figure 4B:
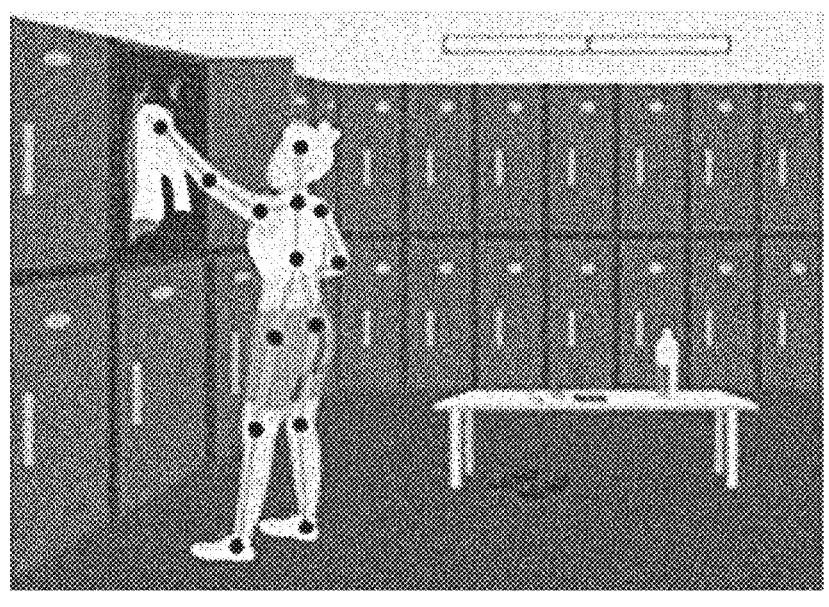
Figures 4C, 5:
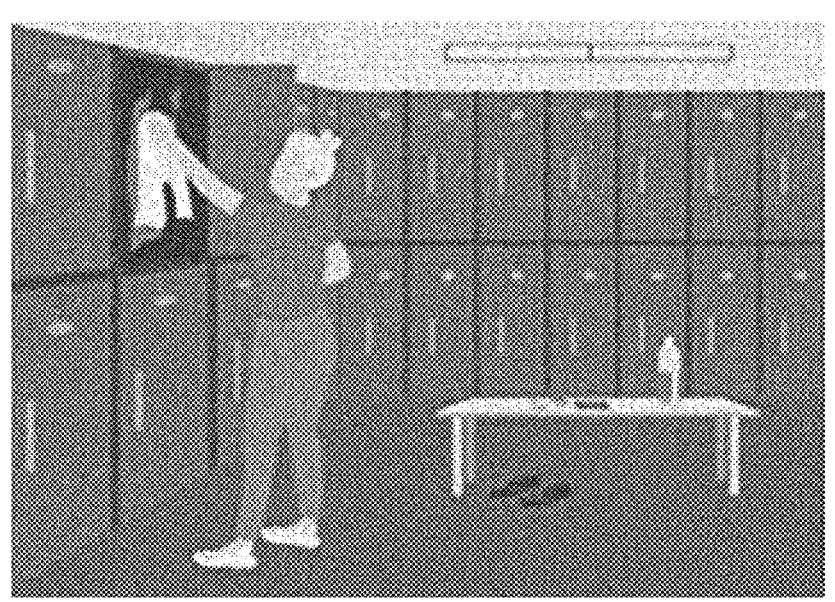

FIGS. 4A to 4C are diagrams showing examples of image conversion phases according to the inventive concept.

First, as shown in FIG. 4A, the smart image processing device may acquire an image of a predetermined area.

Subsequently, as shown in FIG. 4B, the smart image processing device may determine whether a person is detected in the acquired image, and when the person is detected in the acquired image, apply a skeleton modeling technique to the person. Through this, the smart image processing device may obtain skeleton (model) data of the person as shown in FIG. 4B.

Thereafter, as shown in FIG. 4C, the smart image processing device may convert a body image of a person into an image (video or still image) of the person wearing clothes based on the skeleton (model) data.

To this end, the smart image processing device may perform step S220 as described below.

More specifically, the smart image processing device may perform (i) a person image detection step of detecting a person image for one or more persons in the image acquired through step S210, (ii) a person image conversion step of performing conversion from the person image detected in the image into an image of a person wearing outer clothing.

As an example applicable to the inventive concept, the smart image processing device may perform the person image detection operation and the person image conversion operation through a single deep learning algorithm. In other words, the smart image processing device may provide the image acquired through step S210 to the single deep learning algorithm as input information, detect an image of a person through the single deep learning algorithm, and perform conversion from an image of the detected person into an image of a person wearing outer clothing.

As another example applicable to the inventive concept, the smart image processing device may perform the person image detection step and the person image conversion step through different deep learning algorithms. In other words, the smart image processing device may detect a person image by providing the image acquired through step S210 as input information to a first deep learning algorithm, and perform conversion into the detected person image into an image of a person wearing outer clothing by providing the detected person image as input information to a second deep learning algorithm.

Through the above-described method, the smart image processing device according to the inventive concept may perform conversion from a body image of all persons in the acquired image into an image of all persons wearing clothes.

As another example, the smart image processing device according to the inventive concept may perform conversion only on a body image of a person satisfying a predetermined condition among persons in the acquired image.

More specifically, the smart image processing device may perform image conversion operation according to step S220 only on a person determined not to be wearing outer clothing among one or more persons detected in the image. In this case, the person determined not to be wearing outer clothing may include at least one of a person determined to be naked and a person determined to be wearing only underwear.

In particular, as in the above-described embodiment, the operation of detecting a person who satisfies a predetermined condition in the smart image processing device may include detecting a person determined to be naked and/or a person determined to be wearing only underwear such that there is no false-negative as much as possible.

In step S230, the smart image processing device may store the image converted through step S220. In other words, the smart image processing device may store the image converted as shown in FIG. 4C in a separate storage device.

Additionally, the smart image processing device according to the inventive concept may display an image of a predetermined area captured by a separate camera device on a separate display device (e.g., a monitor, a mobile phone terminal, a smart phone, or the like). In this case, the smart video image processing device may perform control to display the converted image by providing (transmitting) the image converted through step S220 to the separate display device.

FIGS. 5 to 8 are schematic diagrams illustrating a smart image processing device according to the inventive concept.

Referring to FIGS. 5 to 8, the smart image processing device according to the inventive concept may have various configurations according to embodiments.

Basically, a smart image processing device 500 may include an image acquisition unit 510, an image conversion unit 520, and a storage unit 530 as shown in FIG. 5. Each component may operate as described below.

The image acquisition unit 510 may acquire an image of a predetermined area. For example, the image acquisition unit 510 may acquire the image from a separate camera device that captures an entire area including the predetermined area. Alternatively, as another example, the image acquisition unit 510 may acquire an image of the predetermined area by directly capturing the entire area including the predetermined area.

When a person is detected in the image acquired through the image acquisition unit 510, the image conversion unit 520 may perform conversion from a body image of the person in the image into an image of the person wearing outer clothing. As an example, the image conversion unit 520 may perform conversion from the body image of the person into an image of the person wearing clothes by applying a skeleton modeling technique to the person detected in the acquired image.

In the above example, the image conversion unit 520 may be configured in one phase as shown in FIG. 5 through a deep learning algorithm trained to enable the above-described image conversion with one deep learning model.

As an additional example, the image conversion unit 520 may have an object selection function. Through this, the image conversion unit 520 may select an object for image conversion and perform image conversion only on the object.

The storage unit 530 may store the image converted through the image conversion unit 520.

7

Figure 6:
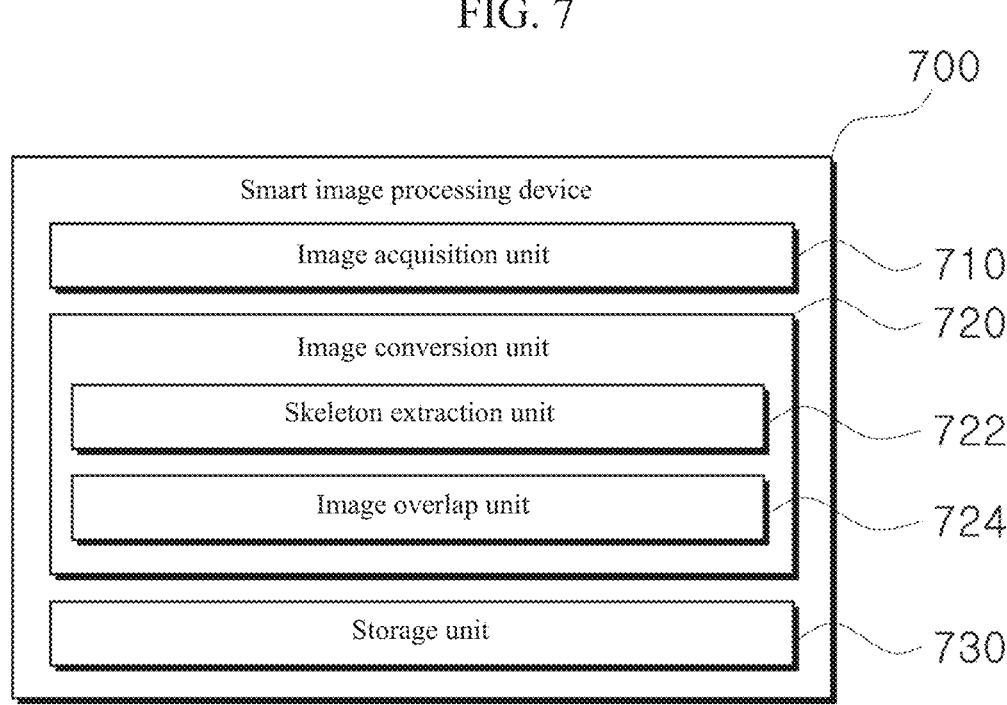

As another example, a smart image processing device 600 may include an image acquisition unit 610, an image conversion unit 620, and a storage unit 630 as shown in FIG. 6, and the image conversion unit 620 may include a conversion target selection unit 622 and an target-specific image conversion unit 624. Each component may operate as described below.

The image acquisition unit 610 may operate in the same manner as the image acquisition unit 510 described above.

When a person is detected in the image acquired through the image acquisition unit 610, the image conversion unit 620 may perform conversion from a body image into an image of a person wearing outer clothing only for a person determined not to be wearing outer clothing among one or more persons detected in the image.

To this end, the image conversion unit 620 may include the conversion target selection unit 622 that detects a person determined not to be wearing outer clothing among one or more persons detected in the image and the target-specific image conversion unit 624 that performs conversion from the body image of a person selected by the conversion target selection unit 622 into the image of a person wearing outer clothing.

In the inventive concept, the person determined not wearing outer clothing may include at least one of a person determined naked and a person determined to be wearing only underwear.

As described above, the image conversion unit 620 may include the conversion target selection unit 622 and the target-specific image conversion unit 624, and may be configured in two phases as shown in FIG. 6.

The storage unit 630 may operate in the same manner as the storage unit 530 described above.

As another example, a smart image processing device 700 may include an image acquisition unit 710, an image conversion unit 720, and a storage unit 730 as shown in FIG. 7, and the image conversion unit 720 may include a skeleton extraction unit 722 and an overlap unit 724. Each component may operate as described below.

The image acquisition unit 710 may operate in the same manner as the image acquisition unit 510 described above.

When a person is detected in the image acquired through the image acquisition unit 710, the image conversion unit 720 may perform conversion from the body image of the person into an image of a person wearing clothes by applying a skeleton modeling technique to the person detected in the image. To this end, the image conversion unit 720 may include the skeleton extraction unit 722 for deriving skeleton (model) data by applying a skeleton modeling technique to one or more people detected in the image and the overlap unit 724 for performing conversion from the body image of the person into an image of the person wearing clothes.

As such, the image conversion unit 720 may be configured in two phases as shown in FIG. 7 by including the skeleton extraction unit 722 and the overlap unit 724.

As an additional example, the above-described skeleton extraction unit 722 may have a target selection function. Through this, the skeleton extraction unit 722 may select a target from which skeleton (model) data is to be extracted among the acquired images, and extract skeleton (model) data only for the target.

The storage unit 730 may operate in the same manner as the storage unit 530 described above.

As another example, a smart image processing device 800 includes an image acquisition unit 810, an image conversion unit 820, and a storage unit 830, as shown in FIG. 8, and the image conversion unit 820 may include a conversion target selection unit 822, a skeleton extraction unit 824, and an overlap unit 826. Each component may operate as described below.

The image acquisition unit 810 may operate in the same manner as the image acquisition unit 510 described above.

When a person is detected in the image acquired through the image acquisition unit 810, the image conversion unit 820 may detect a person determined not to be wearing outer clothing among one or more persons detected in the image and perform conversion from a body image into an image of a person wearing outer clothing by applying the skeleton modeling technique only to the detected person. To this end, the image conversion unit 820 may include the conversion target selection unit 822 that detects a person determined not to be wearing outer clothing among one or more persons detected in the image, the skeleton extraction unit 824 that derives skeleton (model) data by applying the skeleton modeling technique to only the detected person, and the overlap unit 826 that perform conversion from a body image of the detected person into an image of the person wearing clothes based on the skeleton (model) data.

As described above, the image conversion unit 820 may be configured in three phases as shown in FIG. 8 by including the conversion target selection unit 822, the skeleton extraction unit 824, and the overlap unit 826.

The storage unit 830 may operate in the same manner as the storage unit 530 described above.

In addition, the smart image processing devices 500, 600, 700, and 800 according to the inventive concept may perform various smart image processing methods described above. To this end, the smart image processing devices 500, 600, 700, and 800 may control each component of the smart image processing devices 500, 600, 700, and 800 according to the various smart image processing methods.

Additionally, the computer program according to the inventive concept may be stored in a computer readable recording medium to execute various smart video image processing methods described above in combination with a computer.

The above-described program may include codes coded in a computer language, such as C, C++, JAVA, or a machine language, which are readable by a processor (CPU) of the computer through a device interface of the computer such that the computer reads the program and execute the methods implemented by the program. The codes may include functional codes associated with a function defining functions necessary to execute the methods or the like, and include control codes associated with an execution procedure necessary for the processor of the computer to execute the functions according to a predetermined procedure. In addition, the codes may further include memory reference codes indicating at which location (address number) of the computer's internal or external memory, additional information or media required for the computer's processor to execute the functions can be referenced. In addition, when the processor of the computer needs to communicate with any other computer or server located remotely to execute the above functions, codes may further include communication-related codes for how to communicate with any other remote computer or server using a communication module of the computer, and what information or media to transmit/receive during communication.

The steps of a method or algorithm described in connection with the embodiments of the inventive concept may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the inventive concept have been described above with reference to the accompanying drawings, it is understood that those skilled in the art to which the inventive concept pertains may implement the inventive concept in other specific forms without changing the technical spirit or essential features thereof. Therefore, it should be understood that the embodiments described above are illustrative in all respects and not restrictive.

According to the inventive concept, a security camera according to the inventive concept can be installed even in a space where personal sensitive information is able to be exposed to capture the space. Through this, an individual's privacy can be protected not to be exposed and at the same time, the occurrence of a crime or dangerous situation in a corresponding area can be minimized.

However, effects of the inventive concept may not be limited to the above-described effects. Although not described herein, other effects of the inventive concept can be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A smart image processing device comprising:
an image acquisition unit configured to acquire an image for a predetermined area through a camera;
an image conversion unit configured to perform conversion from a body image of a person in the image into an image of the person wearing outer clothing when the person is detected in the acquired image; and
a storage unit configured to store the converted image,
wherein the image conversion unit is configured to:
obtain skeleton data based on joints or movement points of the person by applying a skeleton modeling technique to the person detected in the acquired image, and
perform conversion from the body image of the person into an image of the person wearing clothes based on the skeleton data,
wherein the image conversion unit is configured to:
detect an image of one or more persons located in the predetermined area in the image based on a first deep learning algorithm, and
perform the conversion only on a person determined not to be wearing outer clothing in the person image,
wherein the image conversion unit is configured to determine that at least one of a naked person and a person wearing only underwear is not wearing outer clothing, and wherein the image conversion unit is configured to perform conversion from the body image of the person into the image of the person wearing outer clothing based on a second deep learning algorithm different from the first deep learning algorithm by using the skeleton modeling technique for the naked person and the person wearing only underwear.

2. The smart image processing device of claim 1, wherein the outer clothing includes clothes capable of covering at least one of all parts of the body image except a face, disliked parts that cause discomfort to others when exposed of an upper body of the body image except the face, and disliked parts of a lower body of the body image except the face.

3. A smart image processing method to be performed by a device, comprising:
acquiring, by an image acquisition unit of the device, an image for a predetermined area;
performing, by an image conversion unit of the device, conversion from a body image of a person in the image into an image of the person wearing outer clothing when the person is detected in the acquired image; and
storing, by a storage unit of the device, the converted image,
wherein the performing of the conversion includes
obtaining skeleton data based on joints or movement points of the person by applying a skeleton modeling technique to the person detected in the acquired image, and
performing conversion from the body image of the person into an image of the person wearing clothes based on the skeleton data,
wherein the performing of the conversion includes
detecting an image of one or more persons located in the predetermined area in the image based on a first deep learning algorithm, and
performing the conversion only on a person determined not to be wearing outer clothing in the person image,
wherein the performing of the conversion includes determining that at least one of a naked person and a person wearing only underwear is not wearing outer clothing,
wherein the performing of the conversion includes performing conversion from the body image of the person into the image of the person wearing outer clothing based on a second deep learning algorithm different from the first deep learning algorithm by using the skeleton modeling technique for the naked person and the person wearing only underwear.

4. The smart image processing method of claim 3, wherein the outer clothing includes clothes capable of covering at least one of all parts of the body image except a face, disliked parts that cause discomfort to others when exposed of an upper body of the body image except the face, and disliked parts of a lower body of the body image except the face.

* * * * *